United States Patent
Repp et al.

(10) Patent No.: US 6,261,397 B1
(45) Date of Patent: Jul. 17, 2001

(54) QUILTING METHOD AND SYSTEM

(75) Inventors: Jilene A. Repp, Hartland; Francis A. Yogerst, West Bend, both of WI (US)

(73) Assignee: June Tailor, Inc., Richfield, WI (US)

( * ) Notice: Subject to any disclaimer, the term of this patent is extended or adjusted under 35 U.S.C. 154(b) by 0 days.

(21) Appl. No.: 09/521,810

(22) Filed: Mar. 9, 2000

(51) Int. Cl.⁷ .................................................. B32B 7/08
(52) U.S. Cl. .................... 156/93; 156/281; 156/324.4; 5/502; 112/117
(58) Field of Search ........................ 5/482, 502; 112/117, 112/116; 428/102, 103, 104, 190, 200; 156/63, 91, 92, 93, 281, 324.4

(56) References Cited

U.S. PATENT DOCUMENTS

| | | |
|---|---|---|
| 2,364,001 | 11/1944 | Schieman . |
| 3,333,280 * | 8/1967 | Hynek ...................................... 2/143 |
| 3,364,063 | 1/1968 | Satas . |
| 3,794,554 | 2/1974 | Caring . |
| 3,853,595 | 12/1974 | Pedginski et al. . |
| 5,958,802 | 9/1999 | Wilson . |

\* cited by examiner

*Primary Examiner*—Michael W. Ball
*Assistant Examiner*—Gladys Piazza
(74) *Attorney, Agent, or Firm*—Andrus, Sceales, Starke & Sawall

(57) ABSTRACT

A method of making a quilt includes a batting including a heat activated adhesive coating each side or faces of the batting. The quilt covers are attached to the batting by sequentially placing the covers onto the respective batting faces and heating each cover and adjacent adhesive by moving a hot iron over each cover. The covers are connected to each by a plurality of spaced yarn or other suitable decorative connecting means which extend through the covers and batting to secure the batting in place and may form a desired decorative pattern. The inactive adhesive remains in the quilt or is removed by washing of the quilt. The batting with the inactive adhesive is provided as a commercially available product.

14 Claims, 1 Drawing Sheet

QUILTING METHOD AND SYSTEM

BACKGROUND OF THE INVENTION

The present invention relates to a quilting method and system and particularly to a method and system for assembling of the top and bottom quilt covers to the opposite faces of a batting.

A quilt generally consists of a top cover and a bottom cover with an interposed soft batting. The upper or top cover may be formed by sewing small pieces to each other to form a decorative cover. The top and bottom covers are further interconnected in multiple spaced locations by various elements which pass through the batting to hold the batting in place and further contributes to the decorative effect.

In the prior art methods and systems, the covers are first manually secured to each other and the batting by safety pins, tacking usually with a special gun, a basting with needle, or application of a spray set active liquid glue to temporarily hold the cover in place during the forming of a final decorative cover, including a finished connection of the cover and batting. The temporary connections are then manually removed to finish the quilt. The attachment and removal are both tedious and time consuming.

Although widely used, an alternative simpler method and system has not been suggested in the prior art.

The present invention includes a novel and less tedious method and system for use in the craft of quilting.

SUMMARY OF THE INVENTION

Generally in accordance with the present invention, the covers are attached to the batting by an inactive adhesive which is activated after assembly of the batting and covers to secure the batting in the necessary position between the covers without the necessity for sewing or other known prior art means which generally require a manual time consuming task for creating and subsequent removal of the temporary attaching means. The inactive adhesive by proper selection may remain part of quilt or removed by washing or the like.

In a preferred method and system, the opposite surfaces of the batting are covered with a thin film of the inactive adhesive and preferably a heat activated inactive adhesive. The inactive adhesive is applied to the batting and the batting sold with the adhesive thereon. Instructions for assembling the covers and activating the inactive adhesive, as by passing a hot iron over the cover are given to secure the cover to the batting. The quilt may then be completed by the known methods of connecting the covers and batting to produce the desired decorative covers.

In summary, an inactive adhesive is interposed between a quilt cover and the adjacent batting to at least temporarily attach the cover to the batting. The bonded quilt covers and batting are then fixedly attached to each other by the usual quilting method and systems to form a decorative cover. The inactive adhesive bonding is preferably applied to attach both covers to the batting for at least the temporary securing of the covers for the subsequent known type of final securing the quilt covers to the inner batting without the prior art necessity of removing temporary connection means.

The inactive adhesive is preferably a heat activated material which is readily activated by the heat of a typical well-known hot ironing unit used for pressing clothing. Other energy or other activated adhesives may be used within the scope of the invention but the heat activated adhesive using a typical hot iron will be readily understood by a typical quilter.

The system reduces the time to complete the quilt and particularly eliminates the time consuming and tedious steps of manually connecting the temporary attachment of the cover and the subsequent removal thereof.

BRIEF DESCRIPTION OF THE DRAWINGS

The drawings illustrate a preferred embodiment of the invention.

In the drawings.

DESCRIPTION OF THE ILLUSTRATED EMBODIMENT

Figure 1:
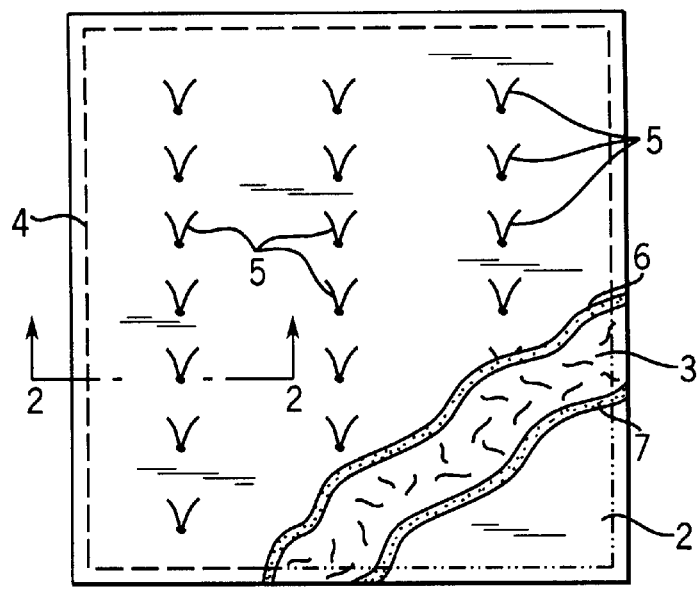
FIG. 1 is a plan view of a quilt constructed in accordance with the present invention, with parts broken away to show detail of the construction.
Figure 2:
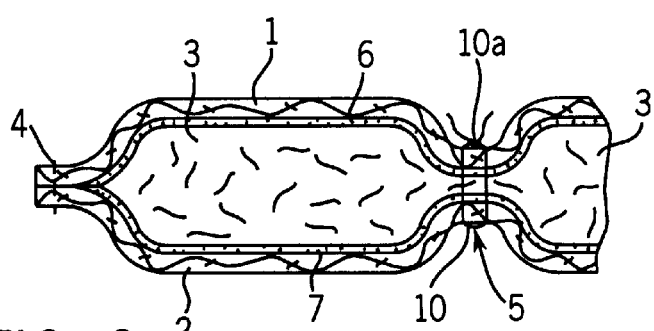
FIG. 2 is a partial cross-section taken generally on line 2—2 of FIG. 1.
Figure 4:
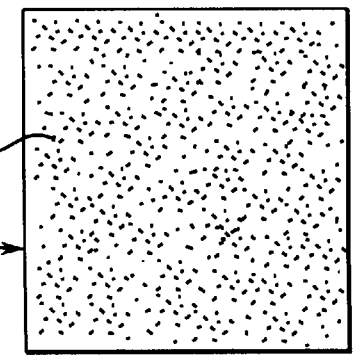
FIG. 4 is a plan view of a batting forming a part of the quilt of FIGS. 1–3.

Referring to the drawings and particularly FIGS. 1 and 2, a quilt is shown including top and bottom covers 1 and 2 separated by a central batting 3. The batting 3 is formed of relatively thick and soft material which is substantially thicker than the cloth covers 1 and 2. The outer edges of the quilt 1 are joined by a sewn connection 4 to enclose the batting 3. In addition, the covers and batting are joined by any of the various prior art methods to form a decorative quilt cover and is shown for purposes of illustration including a plurality of spaced connectors 5. Each connector 5 is a thread of yarn or other material, which secures the covers 1, 2 and the batting 3 together to hold the batting 3 in place and to form a decorative cover.

FIGS. 1 and 2, as described above, generally illustrate a typical prior art quilt which is hand prepared by individuals in the quilting art. The covers 1 and 2 are formed of a suitable cloth and the batting 3 of the thicker and soft material. The one cover may be formed of small individual pieces, not shown, which are separately sewn together to form a highly decorative cover. In a typical prior quilting method, the covers and batting are temporarily joined by stitching, or other prior art means as discussed above, throughout the assembly to temporarily hold the covers and batting in place during the completing of connectors 5, after which the temporary attachment means is manually removed.

In accordance with the present invention, the quilt of FIGS. 1 and 2 include adhesive connections 6 and 7 at the interfaces of covers 1 and 2 to the batting 3. As more fully developed hereinafter, adhesives 6 and 7 are applied throughout the interfaces in an inactive state and the adhesive is selected such as to remain part of the quilt or may be removed by hand or machine washing of the quilt or other suitable means.

Figure 3:
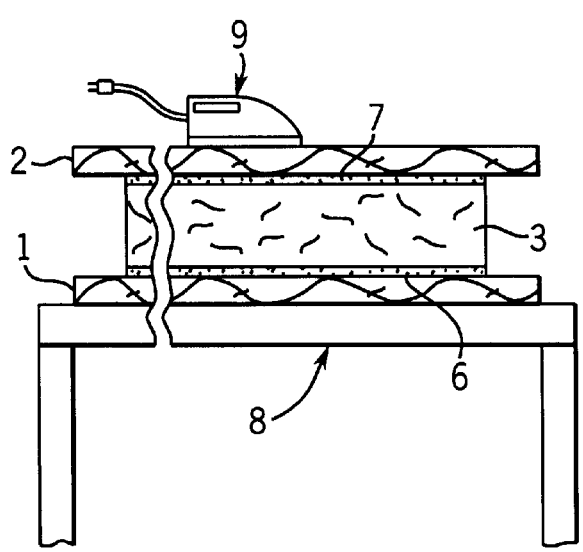
FIG. 3 is an enlarge partial view of the quilt in the process of forming the quilt of FIG. 1.

More particularly, the batting 3 is preferably a preformed member with outer inactive adhesive coatings 6 and 7 applied to the faces of the batting, as more clearly shown in FIG. 3, which illustrates the members 1–3 assembled with the coatings 6 and 7 on the batting 3. The adhesive coatings 6 and 7 are relatively thin coatings and each is shown substantially enlarged for purposes of illustration. The coatings are such as to maintain a soft, flexible quilt if they are to remain a part of the final quilt. The inactive adhesive coating is activated after assembly with covers to form an active adhesive which joins the covers 1 and 2. A preferred adhesive is heat activated to convert the inactive adhesive to a bonding state.

In the process of forming the quilt, the covers 1 and 2 and the batting 3 are cut to the desired shape. The batting 3 has the inactive adhesives 6 and 7 on the opposite sides or faces. As shown in FIG. 3, the batting assembly of FIG. 3 is placed on a support 8, such as a table, with the adhesive 7 on the exposed top face. The cover 2 is placed, in proper alignment, on the batting 3. The coating is activated by heating. In a preferred method, a conventional hot electric iron unit 9 is applied over the entire surface of the cover 2. The heat of the iron activates the inactive adhesive 7 and fixes the cloth cover 2 to the batting 3. The batting 3 with the attached cover 2 is reversed upon table 8 and the cover 1 is aligned with the batting 3. The hot iron unit 9 is again moved over the cover 1, activating the inactive adhesive 6 on the abutting face of the batting to join the cover 6 to the batting 3.

The covers 1 and 2 are thereby sequentially fixed, at least temporarily, to the batting 3, and the assembly is ready to receive the connectors 5, which are attached in a conventional manner. Each illustrated connector 5 is generally a U-shaped thread 10 passing through the assembly and secured by a knot 10*a* to the quilt, as shown in FIG. 2, in accordance with one of the many prior art methods for forming a decorative covered quilt.

After all or a significant forming of the decorative cover, the partially finished quilt is completed by securing the edges as by the sewn connection 4.

The adhesive used is preferably a thin layer which maintains the complete flexibility and softness of the quilt, and is preferably a material which may be removed by washing or otherwise treating of the quilt.

More particularly, the adhesive 6–7 in the preferred construction is an adhesive such as sold under the trademark "Sol-U-Web" and manufactured and sold by Freudenburg Nonwoven Group of 20 Industrial Avenue, Chelmsford, Mass. 01824. The adhesive is a water soluble nonwoven adhesive material having an inter-laced construction for bonding fabrics. The adhesive as applied to the batting 3 was a less concentrated version of the product as sold to the general public. The inactive adhesive is readily heat activated and may remain a part of the final quilt, or readily removed by hand or machine washing the quilt. Those skilled in the art can provide other adhesives suitable for use in the present invention based on the teaching of the invention.

In the current construction of the batting, the adhesive is sprayed over the opposite faces of batting and forms a thin coating to mass produce batting with in-place inactive adhesive. The batting is thus readily available in desirable sizes in a state for assembly to the covers by the quilting trade.

The above adhesive, or any other suitable inactive adhesive, could be supplied in the quilting market for appropriate application by the individual quilters. The factory mass produced product provides accurate control of the applied adhesive and the benefits of mass production as well as quality control to produce an optimal system securing the covers to the batting.

The batting 3 may be of any suitable material such as presently used in quilting or others having the necessary softness, and which is compatible with the adhesive. Acceptable present day batting is of various types and generally includes 100% cotton, cotton and polyester blends and 100% polyester. Presently used batting has included 100% cotton and 100% polyester as well as 80% cotton/20% polyester, with various types of the 100% polyester batting identified as high loft, a low loft or a needle punch/traditional type. The above disclosed product as presently produced are typical construction and are not limited with respect to the scope of the present invention.

The present invention has been found to produce a high quality quilt which is equal to or better than that produced with the time consuming and tedious prior art stitching or other means.

The preferred embodiment of the invention has been described using a heat activated adhesive which is applied to the batting and which is then sold with proper instructions for use. Any other activatable adhesive may be used to form the adhesive covered batting sold as a unit for application by the quilter. The preferred embodiment has both surfaces of the batting fully covered. Further, the system may have the inactive adhesive applied by the quilter by a suitable spray unit or other applicators which can establish the desired inactive adhesive coating. Although not considered as a particularly practical system, a thin adhesive film may be applied to the cloth cover. However, this would normally require care in the application and would not provide the final advantages of the preferred systems disclosed in the preferred embodiment and the other possible variations discussed above. The inactive adhesive may also be applied in various patterns which do not form a complete and continuous adhesive over the batting face, but which properly secure the covers and batting to permit application of the desired decorative cover. In summary, the preferred embodiment provides a most effective and useful inactive adhesive cover attachment for producing the necessary final decorative connection of the covers to the batting in the quilting art. However, variations of the method of producing and applying an effective inactive adhesive type for subsequent assembly during the quilting steps of attaching the covers to the batting may be found by those skilled in the art based on the teaching herein and are within the scope and teaching of the present invention and accompanying claims.

We claim:

1. A method of making a quilt, comprising forming top and bottom covers, forming a batting having top and bottom faces for location between said top and bottom covers, said batting having an inactive adhesive on said top and bottom faces, assembling said batting between said top and bottom covers with said inactive adhesive abutting said top and bottom covers, activating said inactive adhesive and forming a temporary attachment of said top and bottom covers to said batting to form an assembly, and said assembly providing for permanently securing said top and bottom covers to said batting at a plurality of spaced locations by manual or machine means to form a finished quilt with a decorative outer covering.

2. The method of claim 1 wherein said inactive adhesive is a heat activated adhesives and including the step of heating said top and bottom covers to activate the inactive adhesive and thereby forming said temporary attachment of said top and bottom covers to said batting.

3. The method of claim 2 wherein the step of heating said inactive adhesive includes moving a hot iron over said top and bottom covers.

4. The method of claim 2 wherein said inactive adhesive covers the complete top and bottom faces of said batting permanently securing said covers to said batting.

5. The method of claim 1 including the step of permanently securing said top and bottom covers to said batting at a plurality of spaced locations and wherein said inactive adhesive is water soluble for removal thereof by washing the finished quilt after said permanently securing said top and bottom covers to said batting.

6. The method of claim 1 wherein said inactive adhesive is water soluble having an interlaced construction.

7. The method of claim 1 wherein said inactive adhesive is a beat activated adhesive, and including the steps of supporting said assembly of said batting and said top and bottom covers on a support with one of said top and bottom covers exposed, heating said exposed cover to activate the inactive adhesive and secure the exposed cover to the batting, reversing said assembly to expose the opposite cover of said top and bottom covers, and heating said opposite cover to activate the inactive adhesive and secure the opposite cover to the batting.

8. The method of claim 7 wherein said heating is established by moving a hot ironing unit over said top and bottom covers.

9. The method of claim 7 wherein said step of securing said top and bottom covers to said batting includes forming a decorative connecting means.

10. A method hod of forming a quilt having first and second covers separated by an inner batting between said first and second covers, comprising locating an inactive adhesive between each of said first and second covers and said inner batting, and activating said inactive adhesive for attaching temporarily said first and second covers to the opposite sides of said inner batting, and permanently securing said first and second covers and inner batting to each other at a plurality of spaced locations extended through said covers for forming a decorative connecting means.

11. The method of claim 10 wherein said inactive adhesive includes a thin coating between contacting sides of said inner batting and said first and second covers.

12. The method of claim 11, wherein said inactive adhesive is sprayed on said inner batting.

13. The method of claim 12 wherein said activated adhesive dissolves in water and including the step of washing said quilt in water to remove said activated adhesive subsequent to forming said decorative connecting means.

14. The method of claim 10 wherein said inactive adhesive is a heat activated adhesive.

* * * * *

UNITED STATES PATENT AND TRADEMARK OFFICE
CERTIFICATE OF CORRECTION

PATENT NO. : 6,261,397 B1
DATED : July 17, 2001
INVENTOR(S) : Jilene A. Repp and Francis A. Yogerst It is certified that error appears in the above-identified patent and that said Letters Patent is hereby corrected as shown below:

<u>Column 4,</u>
Line 56, delete "adhesives" and substitute -- adhesive --.

<u>Column 6,</u>
Line 1, delete "hod".

Signed and Sealed this

Fourteenth Day of January, 2003

JAMES E. ROGAN
*Director of the United States Patent and Trademark Office*